(12) United States Patent
Montemayor et al.

(10) Patent No.: US 11,629,898 B2
(45) Date of Patent: Apr. 18, 2023

(54) HVAC CONDENSER COIL ISOLATORS

(71) Applicant: Lennox Industries Inc., Richardson, TX (US)

(72) Inventors: Miguel Montemayor, Carrollton, TX (US); William Toombs, Jr., Carrollton, TX (US); Aylan A. Him, Coppell, TX (US); Tate Joseph Byers, Farmers Branch, TX (US)

(73) Assignee: Lennox Industries Inc., Richardson, TX (US)

( * ) Notice: Subject to any disclaimer, the term of this patent is extended or adjusted under 35 U.S.C. 154(b) by 139 days.

(21) Appl. No.: 17/230,982

(22) Filed: Apr. 14, 2021

(65) Prior Publication Data

US 2021/0239371 A1 Aug. 5, 2021

Related U.S. Application Data

(62) Division of application No. 16/015,174, filed on Jun. 21, 2018, now Pat. No. 11,015,849.

(51) Int. Cl.
| | |
|---|---|
| *F25B 39/00* | (2006.01) |
| *F25B 39/04* | (2006.01) |
| *F28F 19/00* | (2006.01) |
| *B23P 15/26* | (2006.01) |

(52) U.S. Cl.
CPC .............. *F25B 39/04* (2013.01); *B23P 15/26* (2013.01); *F28F 19/002* (2013.01)

(58) Field of Classification Search
CPC .......... F24F 1/0323; F24F 1/16; F28F 1/0323; F25B 39/04; F25B 2500/13; F25D 23/006
See application file for complete search history.

(56) References Cited

U.S. PATENT DOCUMENTS

| | | |
|---|---|---|
| 2009/0038328 A1 | 2/2009 | Piccione |
| 2013/0186112 A1 | 7/2013 | Koefele |
| 2016/0334156 A1* | 11/2016 | Kawabata ............... F28F 1/126 |

* cited by examiner

*Primary Examiner* — Brian M King
(74) *Attorney, Agent, or Firm* — Johnston IP Law, PLLC

(57) ABSTRACT

In one instance, an isolator for a heating, ventilating, and cooling (HVAC) system is provided that is a formed plastic member that is disposed between dissimilar metals of the bottom of the condenser and a base pan that supports the condenser or between two dissimilar metals of another HVAC heat exchanger. The isolator separates the two dissimilar metals involved from each of those components and also provides gaps or apertures to drain any water that otherwise might become standing water that potentially causes oxidation or increased oxidation. Other aspects are disclosed.

6 Claims, 6 Drawing Sheets

HVAC CONDENSER COIL ISOLATORS

RELATED APPLICATIONS

This application is a divisional of U.S. application Ser. No. 16/015,174 filed Jun. 21, 2018, which is incorporated herein for all purposes.

TECHNICAL FIELD

This disclosure is directed, in general, to heating ventilating and cooling (HVAC) systems, and more specifically, to HVAC condenser coil isolators, systems, and methods.

BACKGROUND

Heating, ventilating, and cooling (HVAC) systems can be used to regulate the environment within an enclosed space. Typically, an air blower is used to pull air (i.e., return air) from the enclosed space into the HVAC system through ducts and push the air into the enclosed space through additional ducts after conditioning the air (e.g., heating, cooling or dehumidifying the air). Unless otherwise indicated, as used throughout this document, "or" does not require mutual exclusivity. Various types of HVAC systems may be used to provide conditioned air for enclosed spaces or other purposes.

These HVAC systems include a number of heat exchangers, notably one or more condensers. The HVAC systems may take a variety of sizes and styles including small residential units and large-scale roof-top units for commercial applications. In the typical HVAC system, the one or more condensers receive compressed, gaseous refrigerant from one or more compressors and condense the refrigerant into liquid form. The condenser discharges compressed, liquid refrigerant, which is then delivered to one or more evaporators to cool air to be provided to the building or for other use. The liquid refrigerant is evaporated as it passes through the evaporator producing the gaseous refrigerant that is delivered to one or more compressors to produce a compressed gas refrigerant that is delivered to the one or more condensers.

The HVAC condensers serve to cool the compressed refrigerant delivered thereto. Because the condenser involves heat rejection, the condensers are often positioned outside of the space to be cooled.

SUMMARY

According to an illustrative embodiment, a heating ventilating and air cooling (HVAC) system includes a closed conduit circuit for holding a refrigerant therein, a compressor fluidly coupled to the closed conduit circuit for compressing the refrigerant, and a condenser fluidly coupled to the closed conduit circuit for cooling the refrigerant. The HVAC system further includes an expansion device fluidly coupled to the closed conduit circuit for lowering the pressure of the refrigerant and an evaporator fluidly coupled to the closed conduit circuit for receiving heat from outside the evaporator and thereby heating the refrigerant in the evaporator. The condenser includes a plurality of condenser coils and having a generally rectangular shape with a first longitudinal edge extending in a long dimension of the rectangular shape, a second longitudinal edge displaced from the first longitudinal edge and extending in the long dimension of the rectangular shape, a first lateral edge extending between the first longitudinal edge and the second longitudinal edge at a first end, and a second lateral edge displaced from the first lateral edge and also extending between the first longitudinal edge and the second longitudinal edge but at the second end. The system also has a condenser base pan disposed underneath the second longitudinal edge of the condenser with respect to a direction of a gravitational field. The condenser is supported by the condenser base pan. A condenser isolator is releaseably coupled to the condenser at the second longitudinal edge and disposed between the second longitudinal edge and the base pan when the condenser is in an installed position such that the second longitudinal edge of the condenser does not touch the condenser base pan.

The condenser isolator of the previous paragraph includes a longitudinal base sized to extend substantially a length of the second longitudinal edge of the condenser and wherein the condenser isolator has a lateral width that is equal to or greater than a lateral width of the second longitudinal edge of the condenser. The condenser isolator further includes a plurality of clamping members coupled to the longitudinal base. Each of the plurality of clamping members includes a first wall member coupled to a first longitudinal periphery of the longitudinal base and an opposed second wall member coupled to a second longitudinal periphery of the longitudinal base. The first wall member and second wall member form an interference fit about the second longitudinal edge of the condenser with respect to the lateral width of the second longitudinal edge when in the installed position adjacent members of the plurality of clamping members are spaced longitudinally from one another along the longitudinal base to form drainage gaps therebetween.

According to another illustrative embodiment, a method for isolating a first metal of a condenser of a heating ventilating and air cooling system from a second metal of a condenser base pan that supports the condenser, wherein the first metal is different from the second metal, includes releaseably coupling a condenser isolator to a bottom longitudinal edge of the condenser and disposing the condenser onto the condenser pan. The condenser isolator comprises a plastic member having generally a u-shape in lateral cross section and having a receiving area at an interior base of the u-shape and having side walls formed with drainage gaps. A center portion of the u-shape is substantially flat.

According to another illustrative embodiment a condenser unit, which is for receiving a refrigerant and cooling the refrigerant, includes a condenser that includes a plurality of condenser coils and having a generally rectangular shape with a first longitudinal edge, a second longitudinal edge, a first lateral edge, and a second lateral edge. The condenser unit further includes a condenser isolator coupled to the second longitudinal edge of the condenser. The condenser isolator includes an isolator body having a substantially u-shaped lateral cross section formed by opposing sidewalls and an intermediate receiving area together defining an isolator interior portion. A center portion of the u-shape, which forms the intermediate receiving area, is substantially flat. The isolator body has a longitudinal length and the opposing sidewalls of the isolator body have a plurality of drainage gaps formed along the longitudinal length of the isolator body. The second longitudinal edge of the condenser is disposed within the isolator interior portion.

According to another illustrative embodiment, a condenser unit for receiving a refrigerant and cooling the refrigerant includes a condenser that includes a plurality of condenser coils and has a generally rectangular shape with a first longitudinal edge, a second longitudinal edge, a first lateral edge, and a second lateral edge. The condenser unit further includes a condenser isolator coupled to the second longitudinal edge of the condenser. The condenser isolator includes an isolator body having a substantially u-shaped lateral cross section formed by a base and opposing sidewalls that define an isolator interior portion. A center portion of the u-shape, which forms the isolator interior portion, is substantially flat. The isolator body has a longitudinal length and the base of the isolator body is formed with a plurality of drainage apertures formed along the longitudinal length of the isolator body. The second longitudinal edge of the condenser is disposed within the isolator interior portion. Other aspects and embodiment are described further below.

DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
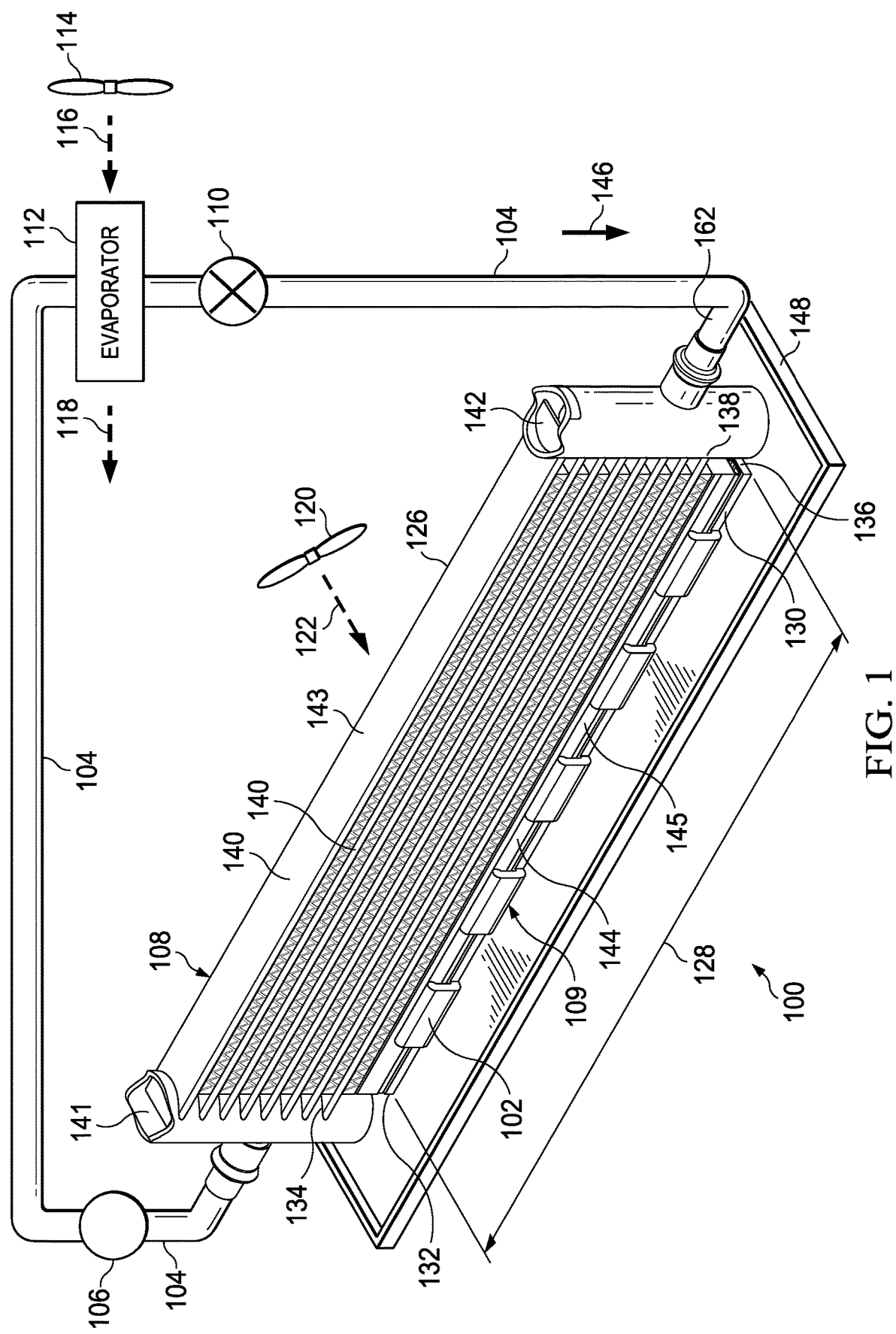
FIG. 1 is a schematic, perspective view of an illustrative embodiment of a heating ventilating and air cooling (HVAC) system according to the disclosure.
Figure 2:
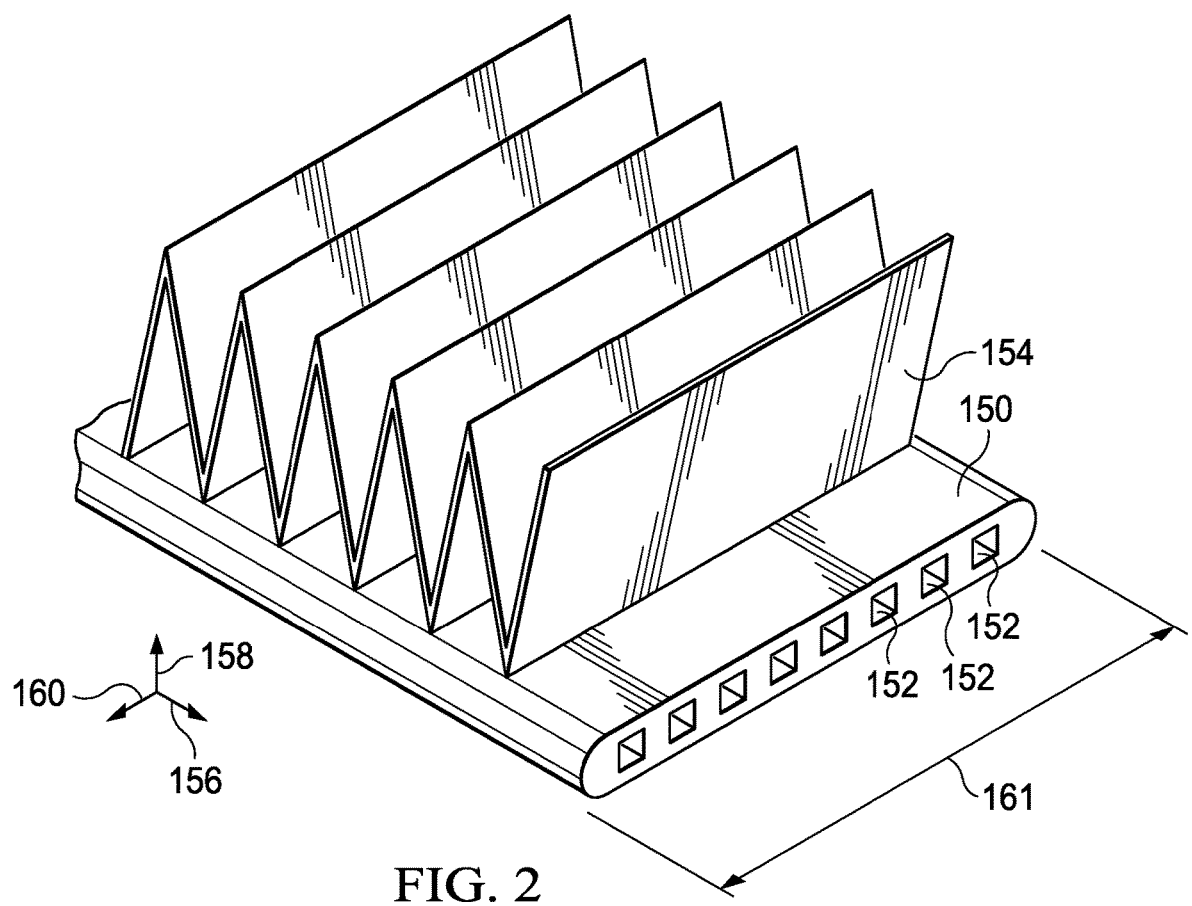
FIG. 2 is a schematic, perspective view of a portion of the condenser of FIG. 1.
Figure 3:
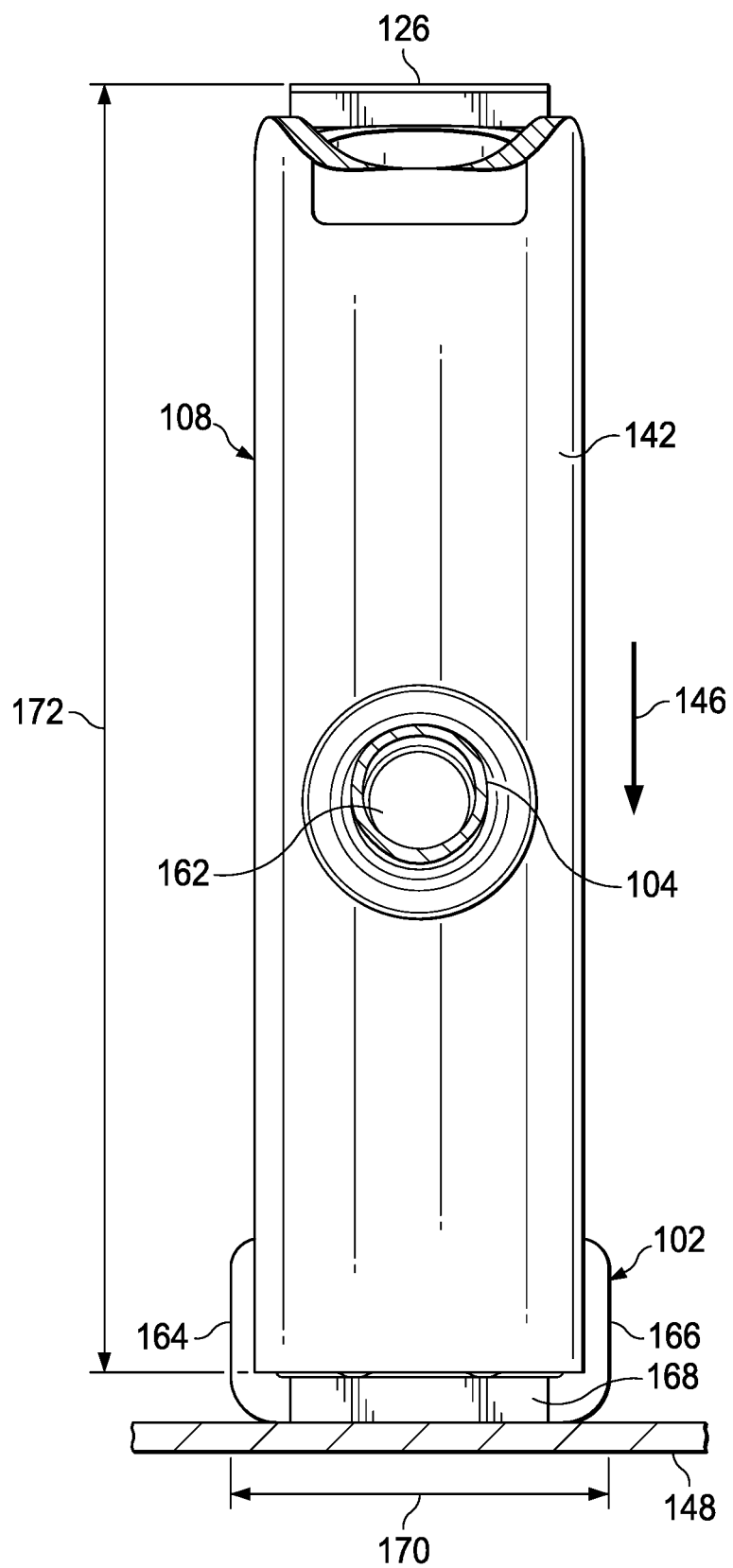
FIG. 3 is a schematic, side elevation view of the condenser of FIG. 1.

Referring now primarily to FIGS. 1-3, and initially to FIG. 1, a heating, ventilating, and cooling (HVAC) system 100 is provided that includes a condenser isolator 102. As explained more fully below, the condenser isolator 102 is formed as a plastic member that is disposed between the bottom of the condenser and a base pan or coil support that supports the condenser. The condenser isolator 102 separates the two dissimilar metals involved that form bottom of the condenser and the base pan and also provides gaps or apertures to drain any water that otherwise might become standing water. Standing water can potentially cause increased oxidation. It should be noted that, while described in the context of a condenser, the condenser isolator 102 may also be used to separate portions of an evaporator or other HVAC heat exchanger.

The HVAC system 100 includes a closed conduit circuit 104 for holding and circulating a refrigerant. The system 100 also includes a compressor 106 fluidly coupled to the closed conduit circuit 104 that compresses the refrigerant and produces a high pressure refrigerant that is delivered to a condenser 108 for cooling. The condenser 108 is fluidly coupled to the closed conduit circuit 104. The condenser 108 may take many forms, e.g., a fin-and-tube condenser coil, but for illustration purposes in this embodiment, is a microchannel condenser. The condenser 108 produces a high pressure liquid refrigerant that has been cooled and is delivered to an expansion device 110.

The expansion device 110 is fluidly coupled to the closed conduit circuit 104 and receives refrigerant from the condenser 108. The expansion device 110 produces a low pressure liquid refrigerant that is delivered to an evaporator 112. The evaporator 112 is fluidly coupled to the closed conduit circuit 104. A first blower 114 moves air 116 across the evaporator 112. The refrigerant in the evaporator thereby receives heat from the air 116 while producing cooled, conditioned air 118. Receiving heat from the air 116 at the evaporator 112 heats the refrigerant in the evaporator 112. In the process of cooling the air 116, the refrigerant becomes a low-pressure gas that is delivered to the compressor 106 and the cycle continues again. A second blower 120 may move air 122 across the condenser 108 to receive heat from the refrigerant within the condenser 108 and thereby cool the refrigerant therein.

The condenser 108 includes a plurality of condenser coils 124, which are positioned outside of the cooling area in which the evaporator 112 cools. The condenser 108 has a generally rectangular shape with a first longitudinal edge 126, which is on the top for the orientation shown) extending in a long dimension 128 of the rectangular shape. The condenser 108 also has a second longitudinal edge 130, which is on the bottom for the orientation shown, displaced from the first longitudinal edge 126 and extending in the long dimension 128 of the rectangular shape. The rectangular shape of the condenser 108 also has a first lateral edge 132, or side edge, extending between the first longitudinal edge 126 and the second longitudinal edge 130. The first longitudinal edge 126 is proximate a first end 134.

Likewise, the rectangular shape of the condenser 108 also has a second lateral edge 136, or side edge, displaced from the first lateral edge 132 and also extending between the first longitudinal edge 126 and the second longitudinal edge 130. The second lateral edge 136 is proximate a second end 138. Individual coil members 140 may be fluidly coupled with a first manifold 141 and a second manifold 142 to circulate the refrigerant back and forth through the coil members 140. In FIG. 1, the top of the manifolds has been removed to show flat tubes 150 therein. The bottom most (with respect to a gravity field 146) coil 144 may not couple to the manifolds 141, 142 and may define a support member that may be covered by the condenser isolator 102 as will be described more herein.

The condenser 108 is supported on a condenser base pan 148, or coil support. The base pan 148 may be made of any of a number of materials, but in one illustrative embodiment is formed from a first metal that is a galvanized sheet metal of steel or coated steel. one illustrative embodiment, the condenser coil 108 has a top condenser coil 143 that comprises the first longitudinal edge 126 and has a bottom condenser coil 145 that comprises the second longitudinal edge 130. While the condenser isolator 102 is shown in FIG. 1 only at the bottom, in another embodiment, the condenser 108 may be formed from two panels of conduits and a junction or interface between the two panels that is in the middle of the rectangular shape may also include another condenser isolator 102 that isolates the coils from a support frame.

Referring now primarily to FIG. 2, in one illustrative embodiment, the condenser 108 (FIG. 1) may be a microchannel condenser and FIG. 2 shows a portion of such a condenser. In particular, FIG. 2 shows one of a plurality of flat tubes 150 supported by a frame (not explicitly shown). The flat tubes 150 include a plurality of channels 152, or passageways or microchannels. The microchannels 152 are for transporting refrigerant through the condenser 108. The microchannels 152 are much smaller in size than the conduits of a conventional fin-and-tube condenser coil. A plurality of fins 154 may be coupled to a portion of each flat tube 150. The fins 154 are shown making a zig-zag pattern but other patterns might be used as well. The microchannels 150 are shown with rectangular cross-sections but other shapes are possible.

The plurality of flat tubes 150 may be extruded from aluminum, copper, or other suitable materials. Often the metal of the flat tubes 150 is different from the metal of the condenser base pan 148. For reference purposes, the condenser 108 extends in a first direction 156 (or longitudinal direction), a second direction 158 (or vertical direction for the orientation shown), and third direction 160. The directions 156, 158, and 160 or axes, are orthogonal to one another. A lateral width 161 of the second longitudinal edge 130 (FIG. 1) of the condenser 108 is shown.

Referring now primarily to FIG. 3, a side elevation view of the condenser 108 is shown with the condenser base pan 148 shown in cross section. Conduit 162, which is part of the closed conduit circuit 104, is shown in cross section. In this view, one may see that the condenser isolator 102 is disposed between the condenser base pan 148 and the condenser 108. Also, as will be described in more detail in connection with FIG. 5, side walls 164, 166 are shown on both sides of the condenser 108. The side walls 164, 166 are coupled to a longitudinal base 168 of the condenser isolator 102. The side walls 164, 166 grip the condenser 108 with an interference fit to hold the condenser isolator 102 in position. The coil isolator 102 may be attached in any way that separates two dissimilar metals. The coil isolator 102 may also be attached to the top or bottom of the coil or any place there is a need to separate two dissimilar metals. The condenser 108 has a lateral width of 170 and a height 172 (for the orientation shown). The gravitational field 146 is shown for this illustrative embodiment. It should be understood that the condenser 108 may be angled in some embodiments between 0-90 degrees with respect to the gravitational field 146 but still oriented with a top and bottom relative thereto.

Figure 5:
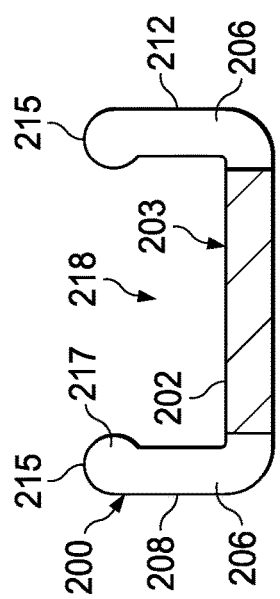
FIG. 5 is a schematic cross sectional view of the condenser isolator of FIG. 4 taken along line 5-5.
Figure 4:
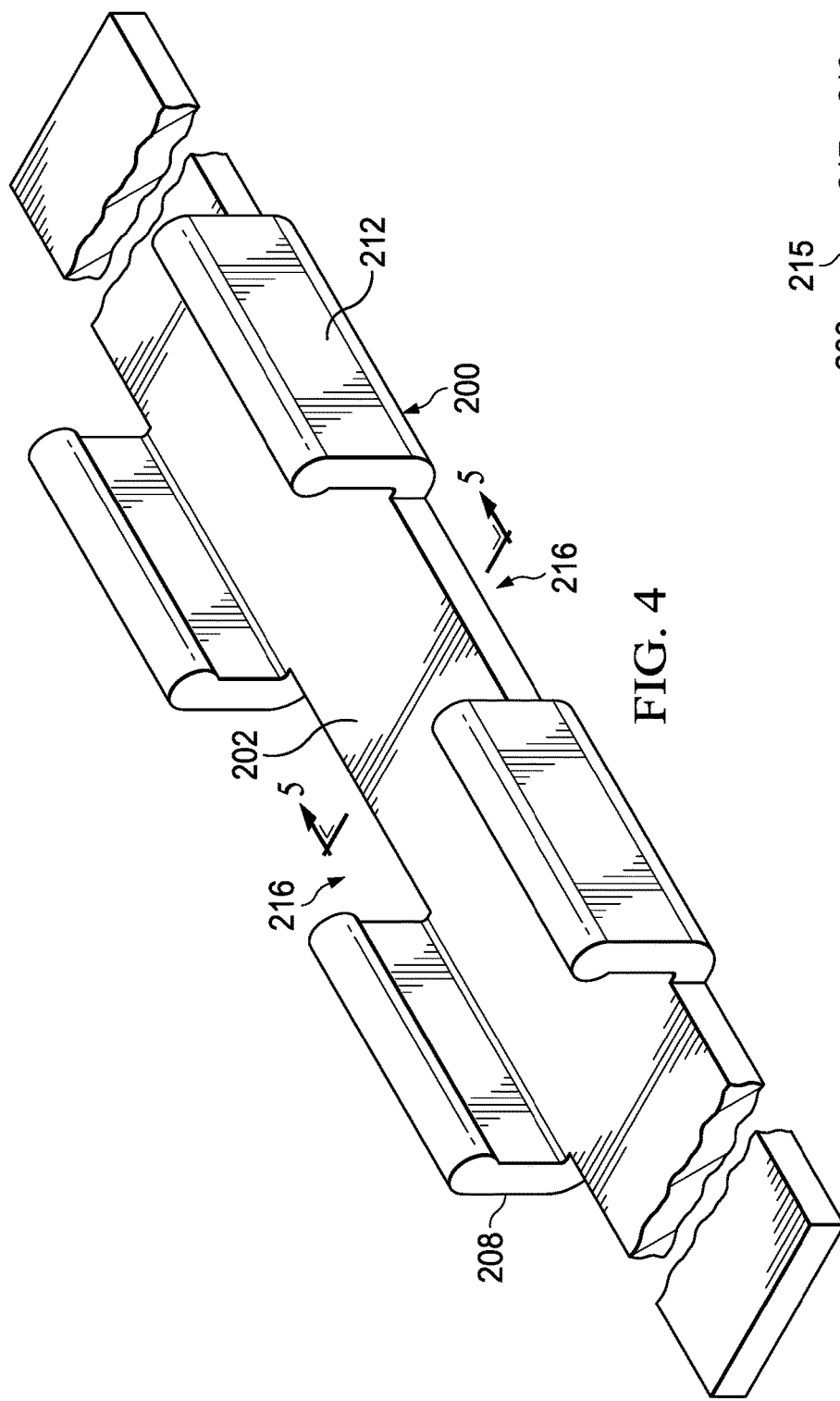
FIG. 4 is a schematic, perspective view of an illustrative embodiment of a condenser isolator.
Figure 6:
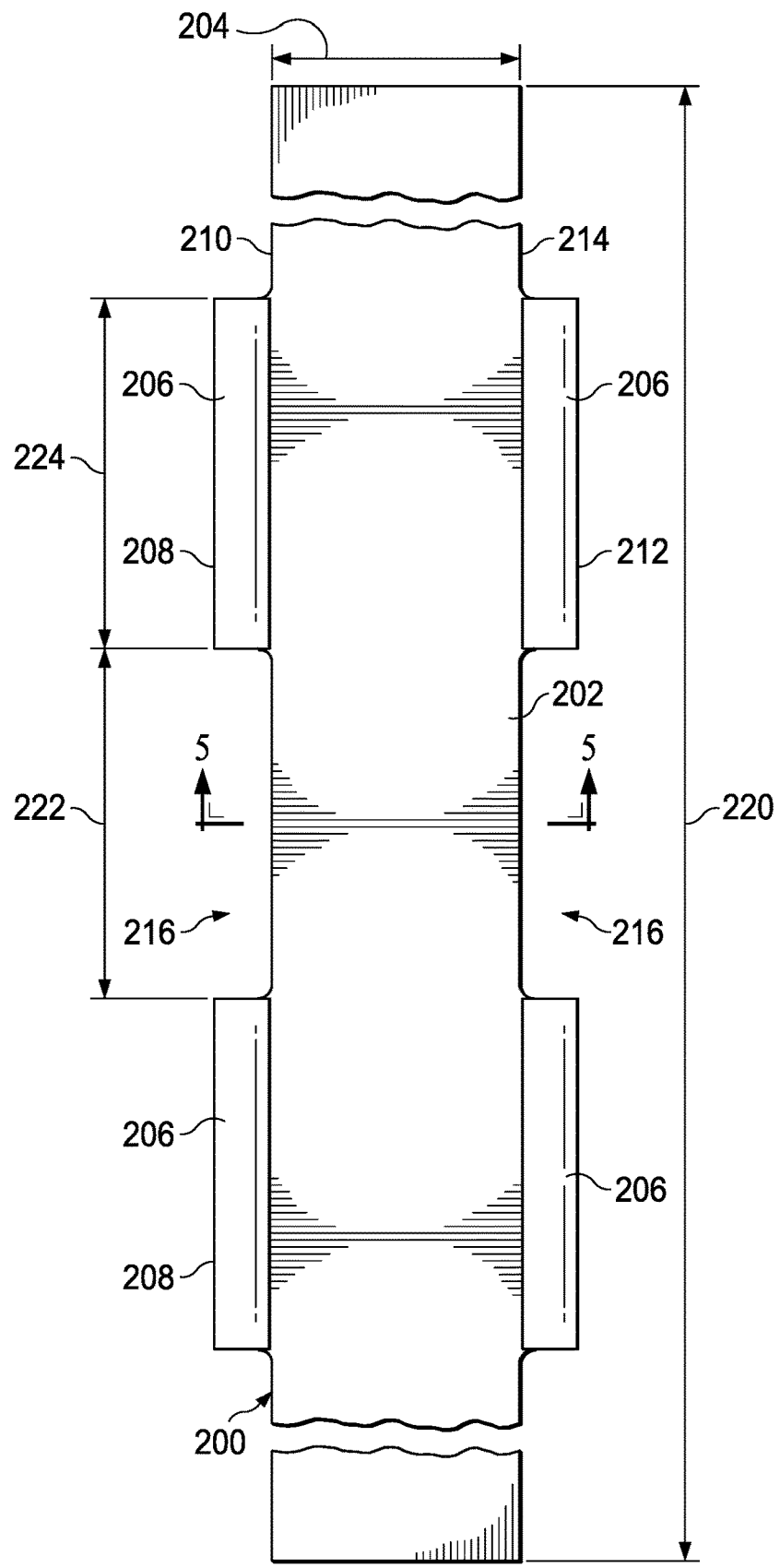
FIG. 6 is a schematic top view of the condenser isolator of FIG. 4.

Referring now primarily to FIGS. 4-6, an illustrative embodiment of a condenser isolator 200 is presented. The condenser isolator 200 may be used as the isolator condenser 102 in the system 100 of FIG. 1. The isolator condenser 200 includes a longitudinal base 202 that is sized to extend substantially a length or long dimension 128 (FIG. 1) of the second longitudinal edge 130 (FIG. 1) of the condenser 108 (FIG. 1). The longitudinal base 202 is typically flat or slightly curved such that it still substantially flat. The condenser isolator 200 has a lateral width 204 (FIG. 2) that is equal to or greater than a lateral width 161 of the second longitudinal edge 130 (FIG. 1) of the condenser 108. The second longitudinal edge 130 of the condenser 108 will fit in it as shown and discussed herein.

The condenser isolator 200 has a plurality of clamping members 206 coupled to the longitudinal base 202. Each of the plurality of clamping members 206 includes a first wall member 208 coupled to a first longitudinal periphery 210 of the longitudinal base 202 and an opposed, displaced second wall member 212 coupled to a second longitudinal periphery 214 of the longitudinal base 202. The first wall member 208 and second wall member 212 sized and configured with the longitudinal base 202 to form an interference fit about the second longitudinal edge 130 with respect to the lateral width 161 of the second longitudinal edge 130 when in the installed position as shown in FIG. 1. The walls 208, 212 and the longitudinal base 202 make a u-shaped portion for receiving the second longitudinal edge 130 as shown clearly in FIG. 3. The bottom of the u-shape portion is substantially flat or only slightly curved so as to receive the second longitudinal edge 130. The bottom need not be perfectly flat but could curve some and still accommodate the second longitudinal edge 130 and thus is referenced as being substantially flat.

Adjacent members of the plurality of clamping members 206 are spaced longitudinally from one another along the longitudinal base 202 to form drainage gaps 216 therebetween. The drainage gaps 216 allow water that finds it way into an isolator interior portion 218 of the condenser isolator 200 to egress therefrom and thereby helps reduce the chances for or minimizes corrosion. The wall members 208, 212 can be coupled in a separate step, formed as shown by molding, or the walls 208, 212 may be formed solid and later the drainage gaps 216 punched out. Also, any apertures (see 302, 410, infra) may be punched as referenced in connection with FIGS. 7 and 8. The condenser isolator 200 is preferably formed from plastic. In one embodiment, the condenser isolator 200 is formed from polypropylene plastic, but those skilled in the art will appreciate that a number of materials may be used.

As shown clearly in FIG. 5, the walls 208, 212 have distal ends 215. The distal ends 215 may be formed with rectilinear members 217, such as a ball-shaped portion, to help grab onto the condenser 108 when the interference fit is used for coupling. In one illustrative embodiment, a corresponding groove (not explicitly shown) may be formed on the coordinated portion of the second longitudinal edge 130 of the condenser 108 to receive the rectilinear members 217.

As shown clearly in FIG. 6, the condenser isolator 200 has a longitudinal dimension 220 and the lateral width 204. The thickness of the condenser isolator 200 is such that an installation technician cannot handle it at its installation length and it has to have enough thickness to form an interference fit that grips the condenser. The condenser isolator 200 may have any thickness so long as the condenser isolator 200 is enough to separate the two dissimilar metals (dimension into the page for FIG. 6), and in one particular embodiment is ⅛ of an inch. The drainage gaps 216 may have various sizes, but in one illustrative embodiment have a longitudinal length 222 in the range of ¼ to 36 inches, and in one illustrative embodiment, the longitudinal length 222 of the drainage gap 216 is approximately one inch. In one illustrative embodiment, the wall members 208, 212 have a longitudinal length 224 of between ¼ and 36 inches, and in one embodiment is 1 inch. In one illustrative embodiment, longitudinal dimension 220 of the condenser isolator 200 is between 2-200 inches and in another embodiment is approximately 82 inches. The gaps and lengths herein may be uniform or patterned or they may vary without a pattern.

Figure 7:
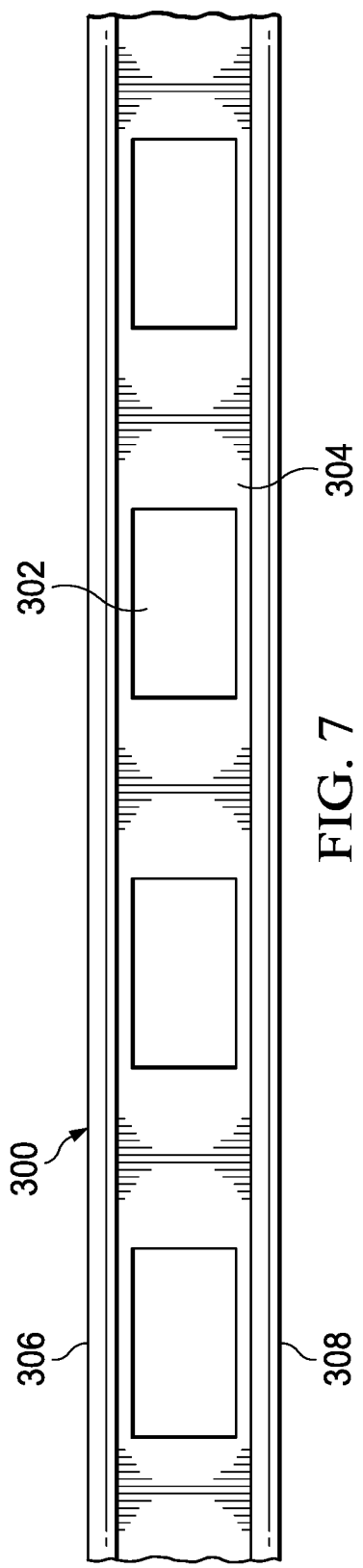
FIG. 7 is a schematic top view of another illustrative embodiment of a condenser isolator.

Referring now primarily to FIG. 7, another illustrative embodiment of a condenser isolator 300 is presented. The condenser isolator 300 may be used as the isolator condenser 102 in the system 100 of FIG. 1. The condenser isolator 300 is analogous to the condenser isolator 200 except instead of using drainage gaps 216, a plurality of drainage apertures 302 have been formed on the longitudinal base 304. Water can egress through the drainage apertures 302. Like before, walls 306 and 308 form an interference fit with the condenser 108.

Figure 8:
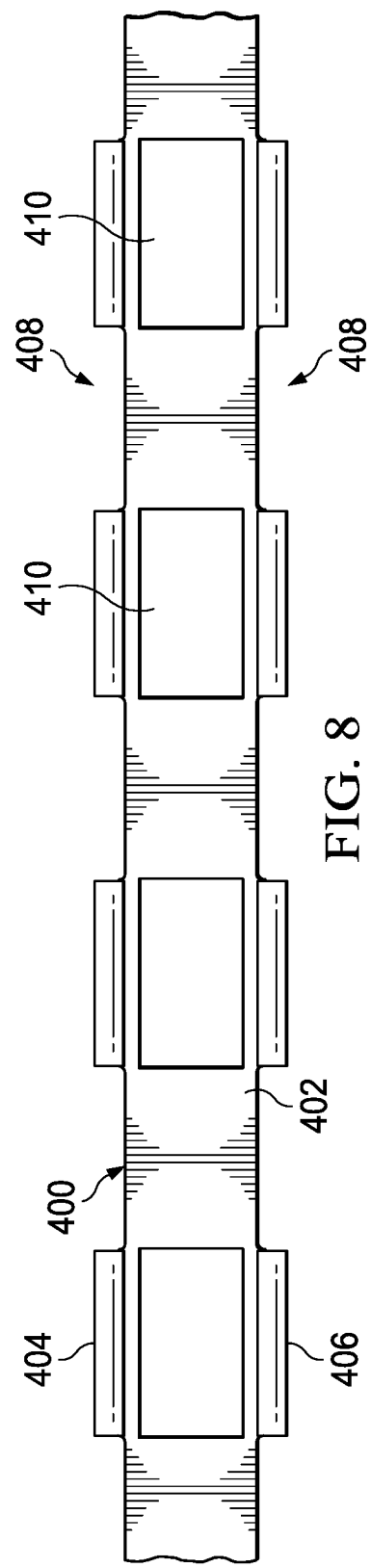
FIG. 8 is a schematic top view of another illustrative embodiment of a condenser isolator.

Referring now primarily to FIG. 8, another illustrative embodiment of a condenser isolator 400 is presented. The condenser isolator 400 may be used as the isolator condenser 102 in the system 100 of FIG. 1. The condenser isolator 400 is formed by combining aspects of the condenser isolator 200 (FIGS. 4-6) and the condenser isolator 300 (FIG. 7). Thus, the condenser isolator 400 has a longitudinal base 402 with side walls 404, 406. The side walls 404, 406 are formed with drainage gaps 408, and the longitudinal base 402 is formed with drainage apertures 410. Water or other liquids can egress through the drainage gaps 408 and the drainage apertures 410.

Referring again primarily to FIGS. 1-6, a method for isolating a first metal of a condenser 108, of a heating, ventilating, and air cooling system 100 from a second metal of a condenser base pan 148 that supports the condenser 108 is presented. The first metal is different from the second metal. The method includes releaseably coupling a condenser isolator 102, 200 to a second longitudinal edge 130, which is on the bottom for the orientation shown, of the condenser 108 and supporting the condenser 108 on the condenser base pan 148. The condenser isolator 102, 200 comprises a plastic member having generally a u-shape in lateral cross section and having an isolator interior portion 218 at an interior base of the u-shape and having side walls 208, 212 formed with drainage gaps 216. A center portion of the u-shape is substantially flat.

In one illustrative embodiment, the step of releaseably coupling a condenser isolator 102, 200 to a second longitudinal edge 130 of the condenser 108 involves moving the side walls 208, 212 of the condenser isolator 200 away from each other to receive the second longitudinal edge 130 (bottom edge for orientation shown) of the condenser 108 into an interior of condenser isolator 200. The second longitudinal edge may touch the receiving area. This same method may be used with any of the condenser isolators 102, 200, 300, or 400.

According to one illustrative embodiment, a condenser unit 109 includes a condenser 108 and a condenser isolator 102. The condenser 108 includes a plurality of condenser coils 140 that have a generally rectangular shape with a first longitudinal edge 126, a second longitudinal edge 130, a first lateral edge 132, and a second lateral edge 136. The condenser unit 109 further includes the condenser isolator 102 (FIG. 1), 200 (FIGS. 4-6), 300 (FIG. 7), 400 (FIG. 8) coupled to the second longitudinal edge 130 of the condenser 108. The condenser isolator includes an isolator body 203 having a substantially u-shaped lateral cross section (FIG. 5) formed with a base 202 and opposing sidewalls 208, 212. The base 202 and sidewalls 208, 212 form an intermediate receiving area 218 that defines an isolator interior portion. A center portion of the u-shape, which forms the intermediate receiving area 218, or isolator interior portion, is substantially flat. The isolator body 203 has a longitudinal length or long dimension 220 and the opposing sidewalls of the isolator body have a plurality of drainage gaps 216 formed along the longitudinal length 220 of the isolator body 203. The second longitudinal edge 130 of the condenser 108 is disposed within the isolator interior portion.

According to another illustrative embodiment, the condenser unit 109 is the same as presented above except the base 202 of the isolator body 203 is formed with a plurality of drainage apertures 302 formed along the longitudinal length of the isolator body 203. Again, the second longitudinal edge 130 of the condenser is disposed within isolator interior portion. In still another version, the drainage gaps 216 are also formed in the side walls 208, 212.

In one illustrative embodiment, a heat exchanger isolator for a heating, ventilating, and cooling (HVAC) system is provided that is a formed plastic member that is disposed between the heat exchanger and a dissimilar metal that supports the heat exchanger. The heat exchanger isolator separates the two dissimilar metals involved that form each of those components and also provides gaps or apertures to drain any water that otherwise might become standing water that potentially causes oxidation or increased oxidation. The plastic isolator separates two dissimilar metals while providing gaps or apertures to drain any water that otherwise might become standing water that potentially causes oxidation or increased oxidation.

In one illustrative embodiment, a method for isolating a first metal of a heat exchanger (e.g., a condenser 108 or an evaporator 112) of a heating ventilating and air cooling system 100 from a second metal of a support portion (e.g., a base pan 148 or another heat exchanger) of an HVAC system, wherein the first metal is different from the second metal, includes releaseably coupling a plastic isolator (see, e.g., isolator 102, 200, 300, 400) to a bottom longitudinal edge of the heat exchanger and disposing the heat exchanger on the support portion of the HVAC system with the plastic isolator against the support portion. The plastic isolator includes a plastic member having generally a u-shape in lateral cross section and having a receiving area at an interior base of the u-shape and having side walls formed with drainage gaps. A center portion of the u-shape is substantially flat.

In the detailed description herein of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The detailed description is, therefore, not to be taken in a limiting sense, and the scope of the present invention is defined only by the claims. Unless otherwise indicated, as used throughout this document, "or" does not require mutual exclusivity.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A method for isolating a first metal of a heat exchanger of a heating ventilating and air cooling (HVAC) system from a second metal of a support portion of the HVAC system, wherein the first metal is different from the second metal, the method comprising:
   releaseably coupling a plastic isolator to a bottom longitudinal edge of the heat exchanger, wherein the heat exchanger forms a parallelepiped member;
   disposing the heat exchanger on the support portion of the HVAC system with the plastic isolator against the support portion; and
   wherein the plastic isolator comprises:
       a plastic member having a substantially u-shaped lateral cross section formed by opposing side walls, wherein the opposing side walls run parallel to the bottom longitudinal edge of the heat exchanger when coupled, and having a receiving area defining an interior;

wherein a center portion of the u-shaped lateral cross section forms the receiving area and is substantially flat, and wherein the plastic member has a longitudinal length, which is a long dimension of the plastic isolator that runs parallel to the bottom longitudinal edge of the heat exchanger when coupled.

2. The method of claim 1, wherein the step of releaseably coupling a plastic isolator to a bottom longitudinal edge of the heat exchanger comprises moving the side walls of the plastic isolator away from each other to receive the bottom longitudinal edge of the heat exchanger into the interior of the plastic isolator.

3. The method of claim 1, wherein the step of releaseably coupling a plastic isolator to a bottom longitudinal edge of the heat exchanger comprises moving the side walls of the plastic isolator away from each other to receive the bottom longitudinal edge of the heat exchanger into the interior of the plastic isolator with the bottom longitudinal edge touching the receiving area.

4. The method of claim 1, wherein the plastic isolator comprises polypropylene.

5. The method of claim 1, wherein a plurality of drainage apertures is formed through the receiving area and wherein the plurality of drainage apertures extend along the longitudinal length of the plastic member.

6. The method of claim 1, wherein the opposing side walls of the plastic member have drainage gaps formed therein along the longitudinal length of the plastic member.

\* \* \* \* \*